(12) United States Patent
Zhang

(10) Patent No.: US 6,473,820 B1
(45) Date of Patent: Oct. 29, 2002

(54) METHOD AND APPARATUS FOR USER LEVEL MONITOR IMPLEMENTATION

(75) Inventor: Hong Zhang, Redwood City, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/454,234

(22) Filed: Dec. 2, 1999

Related U.S. Application Data

(60) Provisional application No. 60/111,398, filed on Dec. 8, 1998.

(51) Int. Cl.[7] .......................... G06F 12/00; G06F 13/38
(52) U.S. Cl. ........................ 710/240; 710/200; 709/100
(58) Field of Search ................................. 710/200, 240, 710/52; 709/1, 100, 106, 107, 102; 712/220, 245

(56) References Cited

U.S. PATENT DOCUMENTS

| | | | |
|---|---|---|---|
| 5,465,362 A | * | 11/1995 | Orton et al. ................ 345/781 |
| 5,706,515 A | * | 1/1998 | Connelly et al. ............ 709/100 |
| 5,881,269 A | * | 3/1999 | Dobbelstein .................. 703/21 |
| 5,924,098 A | * | 7/1999 | Kluge ........................ 707/100 |

OTHER PUBLICATIONS

Bacon et al., "Thin Locks: Featherweight Synchronization for Java", 1998, IBM T.J. Watson Research Center.

* cited by examiner

*Primary Examiner*—Xuan M. Thai
(74) *Attorney, Agent, or Firm*—Beyer Weaver & Thomas LLP

(57) ABSTRACT

Methods and apparatus for implementing an atomic monitor wait operation are disclosed. According to one aspect of the present invention, a computer-implemented method for implementing an atomic monitor wait operation includes creating a semaphore specific to a first thread. The semaphore is then placed in a wait queue associated with an object whose object lock is owned by the first thread in order to, in one implementation, preserve queue order. The first thread then exits a monitor associated with the object by, in one embodiment, releasing the object lock. The first thread then suspends execution until the semaphore receives notification that the object lock is available.

16 Claims, 4 Drawing Sheets

METHOD AND APPARATUS FOR USER LEVEL MONITOR IMPLEMENTATION

CROSS REFERENCE TO RELATED APPLICATIONS

This application claims benefit of priority under 35 U.S.C. §119(e) of U.S. Provisional Application No. 60/111,398 filed Dec. 8, 1998 which is hereby incorporated by reference. This application is also related to patent application Ser. No. 09/454,918, entitled "METHOD AND APPARATUS FOR CONVERTING A LIGHTWEIGHT MONITOR TO A HEAVYWEIGHT MONITOR" filed simultaneously herewith, which is assigned to the assignee of the present application and is incorporated herein by reference in its entirety.

BACKGROUND OF THE INVENTION

1. Field of Invention

The invention relates generally to methods and apparatus implementing a monitor wait operation in an object-based computing system. More particularly, the invention relates to methods and apparatus for a thread to atomically release a monitor lock and enter a corresponding wait queue in an object-based computing system.

2. Description of Relevant Art

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack.

Since an activation of one method may activate another method, an execution stack operates in a first-in-last-out manner.

During the execution of an object-based program, a thread may attempt to execute operations that involve multiple objects. On the other hand, multiple threads may attempt to execute operations that involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization construct before invoking the method.

Synchronization constructs such as locks, mutexes, semaphores, and monitors may be used to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object. With respect to FIG. 1, a process of acquiring an object lock will be described. The process of acquiring an object lock begins at step 104 where a thread obtains the object on which the thread wishes to operate. In general, the object on which the thread intends to operate has an associated object lock. Then, in step 106, a determination is made regarding whether the object is locked. That is, a determination is made regarding whether the object lock associated with the object is held by another thread, e.g., a thread that is currently operating on the object.

If the determination in step 106 is that the object is not locked, then the thread acquires the object lock in step 108. Alternatively, if the object is locked, then the thread waits for the object to be unlocked in step 110. Once the object is unlocked, process flow moves from step 110 to step 108 where the object is locked by the thread.

As previously mentioned, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

When threads are synchronized, in order to make certain that only the thread that possesses an object lock is allowed to operate on a locked object, synchronization constructs are generally provided. One such synchronization construct is known in the art as the monitor. Monitors are simple yet fundamental thread synchronization constructs used in, for example, the JAVA™ platform of the Sun Microsystems Corporation of Palo Alto, Calif. Typically, monitors are implemented using low-level synchronization primitives such as mutexes and the like.

In some situations, a thread owning a target object's monitor may wish to release the target object's monitor and suspend execution by issuing what is referred to as a wait operation. When a thread calls a monitor wait operation, all synchronization locks on the target object associated with the thread are released allowing other threads to enter the monitor (i.e.; get the mutex) associated with the target object. After release of the synchronization locks, the thread is placed (enqueued) in the wait queue associated with the target object until such time as (1) another thread calls a notify method or a notifyALL method, or (2) a timeout period has elapsed. As known in the art, the notify method removes an arbitrary thread from the wait queue which then competes for the mutex on the target object, whereas a notifyALL method removes all threads from the wait queue.

The conventional method of implementing a monitor wait operation presents a number of problems. One such problem occurs when a notification is lost. For example, if a first thread is attempting to issue a monitor wait it must first release the monitor lock and prepare to sleep (i.e.; suspend execution). If, however, a second thread grabs the target object's lock and issues a monitor notify before the first thread has entered the wait queue, the notification will be lost since wait queue is empty. In this case, the first thread will be sleeping until the timeout period has elapsed wasting valuable time in the process.

Another problem associated with the conventional approach to issuing a monitor wait is related to inappropriate queuing order in the wait queue. Inappropriate queuing order may arise if during the period of time between a first thread releasing a monitor lock and entering an associated wait queue, a second thread enters the monitor and issues its own monitor wait. In this case, the second thread may enter the wait queue before the first thread thereby compromising the queuing order.

And still another problem associated with the conventional approach to issuing a monitor wait is related to those situations where a notifyALL is issued by the monitor owner. In this case, all waiting threads then compete for the object lock which causes a substantial waste of CPU time. It should also be noted that in some cases, a timeout, a thread interrupt, and a wait notification may occur substantially simultaneously which cannot be supported by most monitor implementations. Therefore, an improved method and apparatus for implementing a monitor wait operation is desirable.

SUMMARY OF THE INVENTION

Broadly speaking, the invention relates to an improved method, apparatus and computer system for implementing an atomic monitor wait operation. According to one aspect of the invention, a computer-implemented method for implementing an atomic monitor wait operation includes creating a semaphore specific to a first thread desiring to exit a monitor associated with a target object. The semaphore is then placed in a wait queue (enqueued) associated with the target object. After the enqueuing, the first thread releases the lock on the target object allowing a second thread to execute a synchronous operation on the target object.

According to still another aspect of the invention, computer program product for implementing an atomic monitor wait operation is disclosed. The computer program product includes computer code that creates a semaphore specific to a first thread desiring to exit a monitor associated with a target object having an object lock as well as computer code that places the semaphore in a wait queue associated with the target object. The computer program product includes computer code that releases the object lock by the first thread thereby allowing a second thread to execute a synchronous operation on the target object, and a computer readable medium that stores the computer codes.

According to yet another aspect of the present invention, a computer system includes a memory and a plurality of threads. The computer system also includes a processor coupled to the memory an object including an object monitor and an associated wait queue, the object monitor being arranged to include information relating to the ownership of object, a first thread selected from the plurality of threads that has locked the object; and a semaphore created by and specific to the first thread. In a preferred embodiment, the first thread places the semaphore into the wait queue 5 prior to releasing an object lock in furtherance of an atomic monitor wait operation.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In a multi-threaded, object-based computing system, objects are typically provided with synchronization constructs to make it possible to prevent more than one thread from operating on an object at any particular time.. One such synchronization construct is referred to as a monitor. A monitor is generally arranged such that only the thread which owns the monitor associated with an object is permitted to execute a synchronized operation on that object. In some cases, a thread may wish to exit a monitor and suspend execution for some period of time not to exceed a predetermined timeout period.

In one described embodiment of the present invention, a system that widely implements atomic monitor wait operations is contemplated. When a first thread desires to exit a monitor associated with a target object, the first thread creates a semaphore specific to the first thread. The first thread then enqueues the semaphore in a wait queue associated with the target object in order to, for example, preserve queue order as well as provide for first thread specific notification of object lock availability. After the semaphore has been enqueued, the first thread exits the monitor by, for example, releasing the object lock.

By implementing an atomic monitor wait operation, system performance is improved since many of the problems related to conventional implementations of monitor wait operations are eliminated. By way of example, by placing a semaphore in the wait queue prior to actually releasing the monitor lock, queue order is preserved since a second thread cannot enter the monitor until after the first thread has released it. In addition, since the second thread notifies the semaphore when the object lock is available, the problems related to thread competition for the object lock are eliminated.

Figure 1:
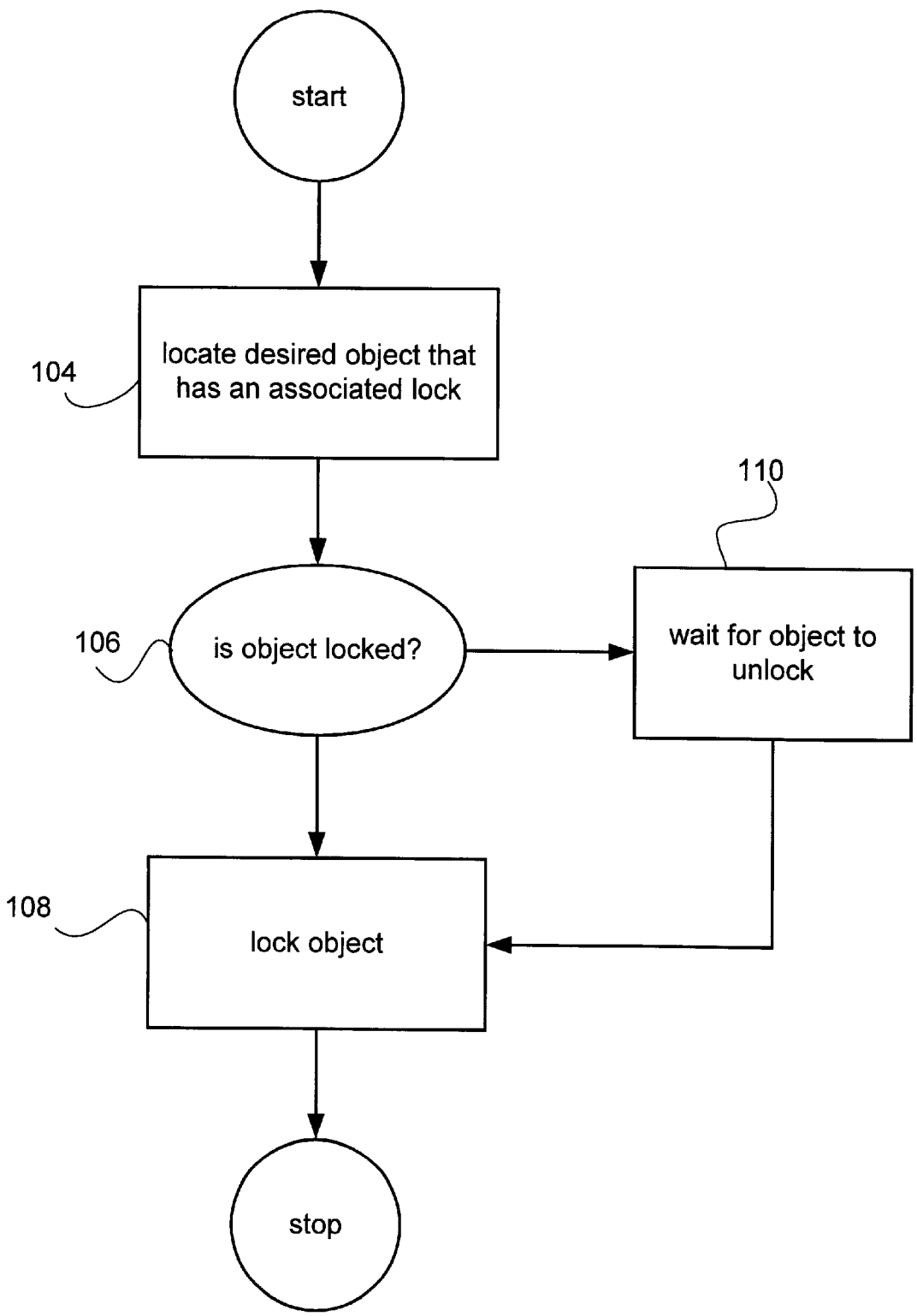
FIG. 1 is a process flow diagram illustrating the steps associated with a conventional method of locking an object.
Figure 2:
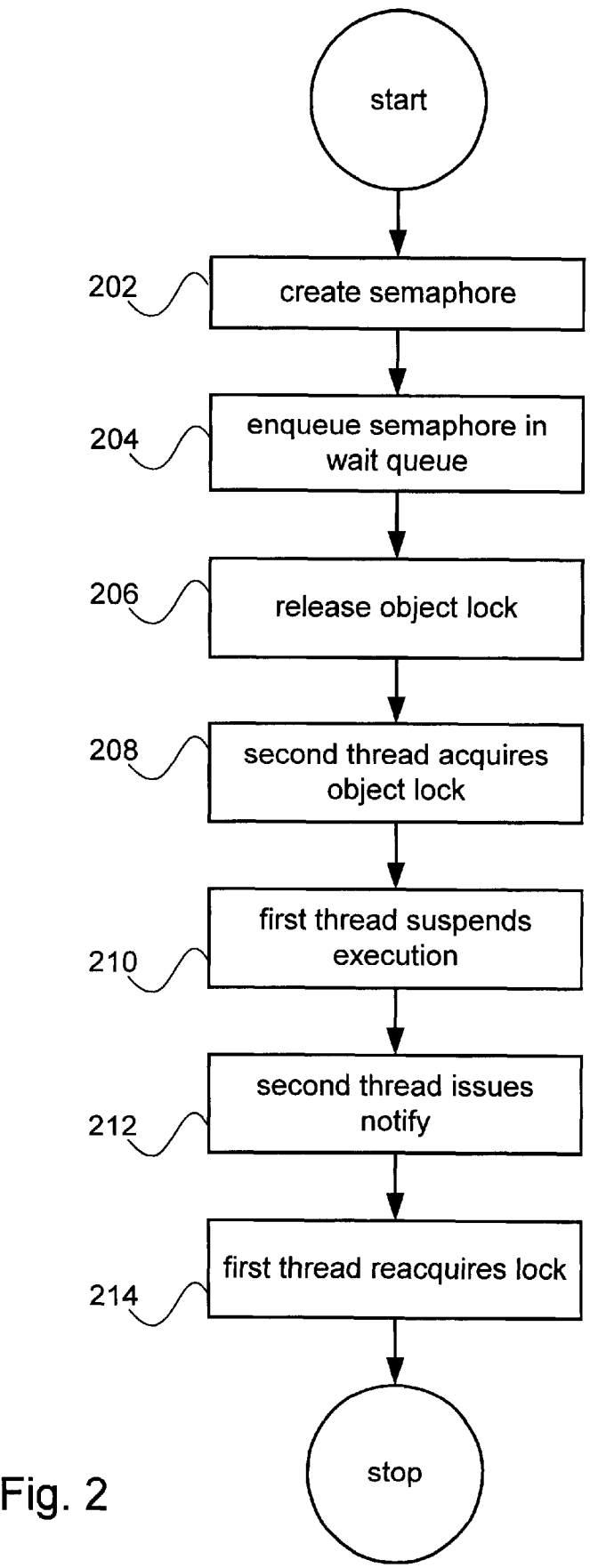
FIG. 2 is a process flow diagram that illustrates a process for implementing an atomic monitor wait operation in accordance with an embodiment of the invention.

FIG. 2 is a process flow diagram that illustrates a process 200 for implementing an atomic monitor wait operation in accordance with an embodiment of the invention.

In the described embodiment, the process 200 begins by a first thread that currently owns a monitor associated with a target object creating a semaphore (202) specific to the first thread. The first thread then enqueues (places) the semaphore into a wait queue associated with the target object (204). The first thread then exits the monitor by, in one embodiment, releasing the object lock (206) which allows a second thread to acquire the object lock (208). The first thread then suspends execution (210) (i.e.; sleeps) until such time as the second thread issues a notify call to the semaphore (212) indicating that the object lock in again available. The first thread then reacquires the object lock (214).

Figure 3:
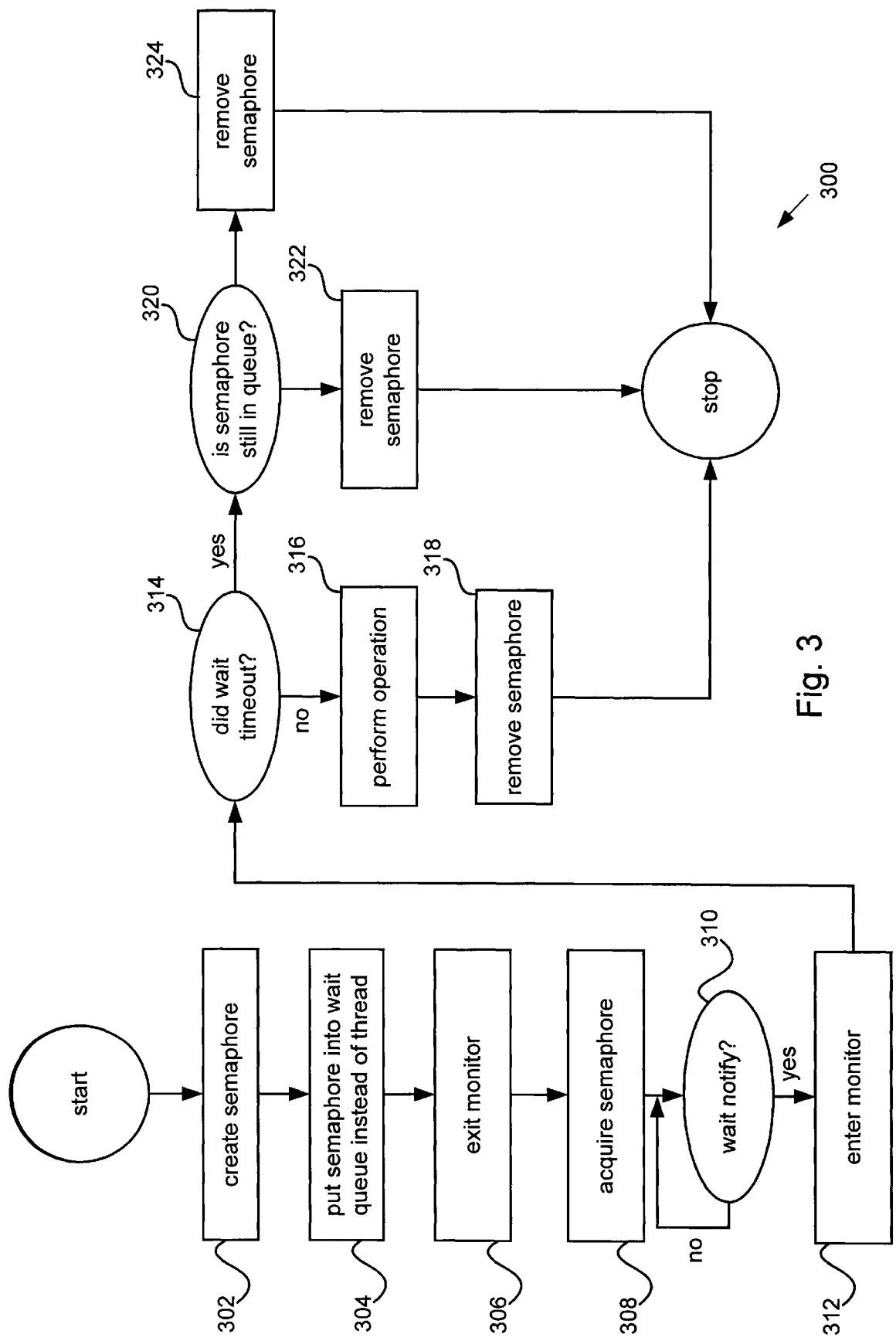
FIG. 3 is one possible implementation of the process described in FIG. 2.

FIG. 3 is a detailed flowchart describing a process 300 as one possible implementation of the process 200 shown in FIG. 2. As such, the process 300 also provides for a first thread that owns a target object to suspend execution by implementing an atomic monitor wait operation. In this way, a second thread can acquire the object lock associated with the target object in order to execute a synchronous operation on the target object.

The process 300 begins by the first thread creating a semaphore specific to the first thread (302). The first thread then enqueues the semaphore into a wait queue associated with the target object (304). The first thread then exits the monitor (306) associated with the target object. In one embodiment, the exiting includes releasing the object lock thereby allowing the second thread to acquire the object lock as well as issuing a notify call. The notify call notifies the second thread that the object lock associated with the target object is available. Once the first thread has exited the monitor, the first thread suspends execution (308) (i.e.; sleeps) until such time as the second thread issues a notify call (310). The second thread issues a notify call specific to the semaphore included in the wait queue when it has completed executing synchronous operations on the target object. In this way, only the first thread is notified that the object lock is available thereby avoiding the problems related to many threads competing for acquisition of the object lock. Once the first thread has been notified, the first thread enters the monitor associated with the target object (312). Once the first thread has entered the monitor, it is determined if the period of time allocated for timeout has elapsed (314). If it has been determined that the period of time allocated for timeout has not elapsed, then the first thread executes a synchronous operation on the target object (316) and the semaphore is removed from the wait queue (318).

Returning to (314), if it has been determined, however, that the period of time allocated for timeout has elapsed, then it is further determined if the semaphore is still in the queue (320). If the semaphore is still in the queue, the semaphore is removed (322). If, however, it has been determined that the semaphore is not still in the queue, then a notify operation is called (324) indicating the object lock is available.

By providing a thread specific semaphore, the present invention eliminates the problems incurred with conventional implementations of monitor wait operations. For example, by placing the semaphore in the wait queue prior to the first thread releasing the target object lock, wait queue order is preserved. In addition, since no other thread can lock the target object until after the first thread has released it, the problem of lost notification is eliminated since the semaphore is placed in the wait queue before the object lock is released.

Figure 4:
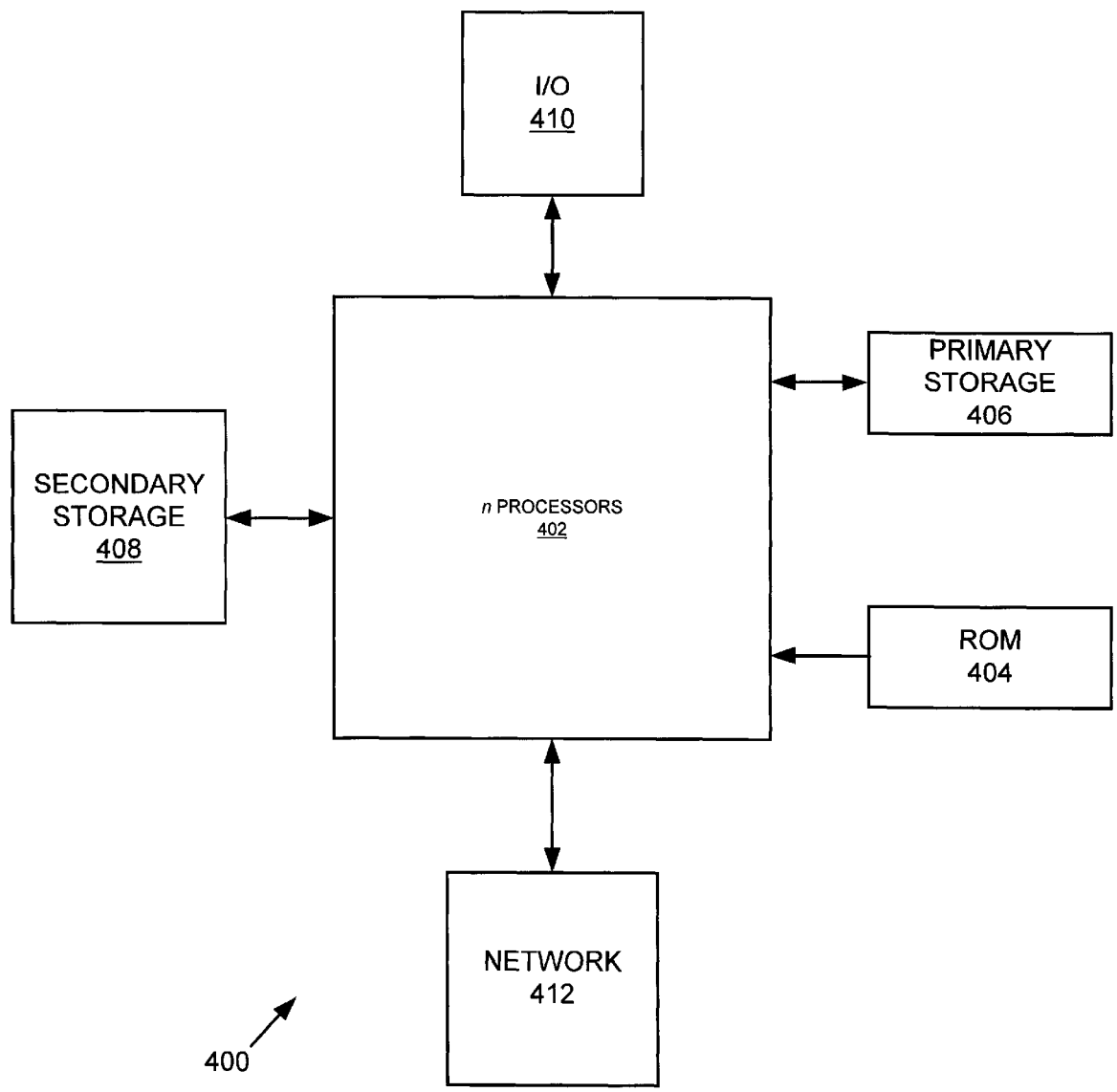
FIG. 4 illustrates a typical, general-purpose computer system suitable for implementing the present invention.

FIG. 4 illustrates a typical, general-purpose computer system 400 suitable for implementing the present invention. The computer system 400 includes any number of processors 402 (also referred to as central processing units, or CPUs) that are coupled to memory devices including primary storage devices 404 (typically a read only memory, or ROM) and primary storage devices 406 (typically a random access memory, or RAM).

Computer system 400 or, more specifically, CPUs 402, may be arranged to support a virtual machine, as will be appreciated by those skilled in the art. As is well known in the art, ROM acts to transfer data and instructions uni-directionally to the CPUs 402, while RAM is used typically to transfer data and instructions in a bi-directional manner. CPUs 402 may generally include any number of processors. Both primary storage devices 404, 406 may include any suitable computer-readable media. A secondary storage medium 408, which is typically a mass memory device, is also coupled bi-directionally to CPUs 402 and provides additional data storage capacity. The mass memory device 408 is a computer-readable medium that may be used to store programs including computer code, data, and the like. Typically, mass memory device 408 is a storage medium such as a hard disk or a tape which generally slower than primary storage devices 404, 406. Mass memory storage device 408 may take the form of a magnetic or paper tape reader or some other well-known device. It will be appreciated that the information retained within the mass memory device 408, may, in appropriate cases, be incorporated in standard fashion as part of RAM 406 as virtual memory. A specific primary storage device 404 such as a CD-ROM may also pass data uni-directionally to the CPUs 402.

CPUs 402 are also coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 402 optionally may be coupled to a computer or telecommunications network, e.g., an internet network or an intranet network, using a network connection as shown generally at 412. With such a network connection, it is contemplated that the CPUs 402 might receive information from the network, or might output information to the network in the course of performing the above-described method steps. Such information, which is often represented as a sequence of instructions to be executed using CPUs 402, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, steps involved with locking an object and unlocking an object may be reordered. Steps may also be removed or added without departing from the spirit or the scope of the present invention.

Although the methods of implementing an atomic monitor wait operation in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

Monitors have been described as being bits that identify whether an object is locked, unlocked, or busy. It should be noted that the number of bits associated with a monitor are generally be widely varied. In addition, it should be appreciated that the status of an object may be identified using mechanisms other than a monitor. By way of example, the object may include a pointer to a list that identifies the status of the object.

While the present invention has been described as being used with a computer system that has an associated virtual machine, it should be appreciated that the present invention may generally be implemented on any suitable object-oriented computer system. Specifically, the methods of locking an unlocking an object in accordance with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for implementing an atomic monitor wait operation, comprising:

creating a semaphore specific to a first thread desiring to exit a monitor associated with a target object having an object lock;

placing the semaphore in a wait queue associated with the target object; and releasing the object lock by the first thread thereby allowing a second thread to execute a synchronous operation on the target object.

2. A method as recited in claim 1, further including:

suspending execution by the first thread;

receiving a notify call by the semaphore when the object lock is available; and reacquiring the object lock by the first thread.

3. A method as recited in claim 2, wherein the receiving further includes determining if a period of time allocated for a timeout condition has elapsed.

4. A method as recited in claim 3, wherein when it is determined that the timeout period has not elapsed then the first thread executes a synchronous operation on the target object.

5. A method as recited in claim 4, further including removing the semaphore from the wait queue.

6. A computer program product for implementing an atomic monitor wait operation, comprising:

computer code that creates a semaphore specific to a first thread desiring to exit a monitor associated with a target object have an object lock;

computer code that places the semaphore in a wait queue associated with the target object;

computer code that releases the object lock by the first thread thereby allowing a second thread to execute a synchronous operation on the target object; and a computer readable medium that stores the computer codes.

7. A computer program product according to claim 6 wherein the computer readable medium is a data signal embodied in a carrier wave.

8. A computer program product according to claim 6 further including computer code that suspends execution by the first thread;

computer code that receives a notify call by the semaphore when the object lock is available; and computer code that re-acquires the object lock by the first thread.

9. A computer system including a memory which includes a plurality of threads, each of the plurality of threads, the computer system comprising:

a processor coupled to the memory; and an object including an object header and an associate wait queue, the object header being arranged to contain a monitor which includes information relating to the ownership of object, a first thread selected from the plurality of threads that has locked the object; and a semaphore created by and specific to the first thread; the first thread places the semaphore into the wait queue prior to releasing an object lock in furtherance of an atomic monitor wait operation.

10. A computer system as recited in claim 9 further including a second thread selected from the plurality of threads, the second thread being arranged to acquire the object lock after it has been released by the first thread in order to execute synchronous operations on the object.

11. A computer system as recited in claim 10 wherein the first thread suspends execution;

receiving a notify call by the semaphore when the object lock is available; and re-acquiring the object lock by the first thread.

12. A computer system as recited in claim 11, wherein when the first thread suspends execution such that when the object lock is made available, the second thread receives a notify call that was generated by the first thread.

13. A computer system as recited in claim 12, wherein when the second thread receives the notify call, a determination is made if a period of time allocated for a timeout condition has elapsed.

14. A computer system as recited in claim 13, wherein when it is determined that the timeout period has not elapsed then the first thread re-acquires the object lock.

15. A computer system as recited in claim 14, wherein the semaphore is then removed from the wait queue.

16. A computer system as recited in claim 15, wherein the first thread executes a synchronous operation on the target object.

* * * * *